US012305431B2

(12) United States Patent
Lin

(10) Patent No.: US 12,305,431 B2
(45) Date of Patent: May 20, 2025

(54) VEHICLE DOOR LOCK ASSEMBLY

(71) Applicant: RV MASTER TECH CO., LTD., Yuanlin (TW)

(72) Inventor: Chia-Cheng Lin, Yuanlin (TW)

(73) Assignee: RV MASTER TECH CO., LTD., Yuanlin (TW)

( * ) Notice: Subject to any disclaimer, the term of this patent is extended or adjusted under 35 U.S.C. 154(b) by 280 days.

(21) Appl. No.: 17/973,912

(22) Filed: Oct. 26, 2022

(65) Prior Publication Data

US 2024/0141703 A1 May 2, 2024

(51) Int. Cl.

| | |
|---|---|
| ***E05B 81/14*** | (2014.01) |
| ***E05B 59/00*** | (2006.01) |
| ***E05B 81/06*** | (2014.01) |
| ***E05B 81/18*** | (2014.01) |
| ***E05B 81/34*** | (2014.01) |
| ***E05B 81/64*** | (2014.01) |
| ***E05B 83/44*** | (2014.01) |
| *E05B 47/00* | (2006.01) |
| *E05B 47/02* | (2006.01) |

(Continued)

(52) U.S. Cl.

CPC .............. *E05B 81/14* (2013.01); *E05B 59/00* (2013.01); *E05B 81/06* (2013.01); *E05B 81/18* (2013.01); *E05B 81/34* (2013.01); *E05B 81/64* (2013.01); *E05B 83/44* (2013.01); *E05B 47/0012* (2013.01); *E05B 47/026* (2013.01); *E05B 63/14* (2013.01); *E05B 81/25* (2013.01)

(58) Field of Classification Search

CPC ...... E05B 59/00; E05B 83/44; E05B 47/0012; E05B 47/026; E05B 63/14; E05B 81/25; E05B 81/14; E05B 81/06; E05B 81/18; E05B 81/34; E05B 81/64

USPC ........................................................ 70/278.1

See application file for complete search history.

(56) References Cited

U.S. PATENT DOCUMENTS

2006/0266088 A1* 11/2006 Lee ......................... E05B 63/08 70/107
2012/0192602 A1* 8/2012 Bacon ................... E05B 47/026 70/278.1

(Continued)

FOREIGN PATENT DOCUMENTS

CN 113622762 A * 11/2021 ............. E05B 77/34
CN 115596296 A * 1/2023

*Primary Examiner* — Kristina R Fulton
*Assistant Examiner* — James Edward Ignaczewski
(74) *Attorney, Agent, or Firm* — Muncy, Geissler, Olds & Lowe, P.C.

(57) ABSTRACT

A vehicle door lock assembly includes a housing, a first locking assembly, a second locking assembly, a driving module and a micro switch. The first locking assembly includes an inner handle, an outer handle and a first lock tongue. The inner handle and the outer handle are disposed on the housing and respectively control the first lock tongue to move. The second locking assembly includes a second lock and a second lock tongue including a first segment and a second segment slidably connected with each other. The second lock includes a mandrel having an assembling portion. The driving module includes a motor assembled with the mandrel, and the second segment is moved when the motor drives the mandrel to rotate. The micro switch includes an inductive element, and the assembling portion has an inductive portion.

9 Claims, 11 Drawing Sheets

(51) Int. Cl.
*E05B 63/14* (2006.01)
*E05B 81/24* (2014.01)

(56) References Cited

U.S. PATENT DOCUMENTS

| | | | | |
|---|---|---|---|---|
| 2015/0279137 | A1* | 10/2015 | Bacon | E05B 81/66<br>70/278.1 |
| 2018/0016810 | A1* | 1/2018 | Bacon | E05B 81/66 |
| 2019/0316391 | A1* | 10/2019 | Bacon | E05B 59/00 |
| 2020/0240183 | A1* | 7/2020 | Bacon | E05B 85/13 |
| 2020/0308880 | A1* | 10/2020 | Lin | E05B 47/0657 |
| 2020/0308884 | A1* | 10/2020 | Lin | E05B 15/04 |

* cited by examiner

VEHICLE DOOR LOCK ASSEMBLY

BACKGROUND OF THE INVENTION

Field of the Invention

The present invention relates to a vehicle door lock assembly.

Description of the Prior Art

Doors of a vehicle such as van or camper generally have door lock assemblies respectively disposed thereon. A conventional door lock assembly includes a first lock tongue and a second lock tongue, the second lock tongue is used to lock a door of the vehicle, and the first lock tongue has a tendency to move outward and be elastically abutted against the door for opening and closing the door. An inner handle and an outer handle of the door lock assembly can effectively control the first lock tongue to move inward. The first lock tongue further has a lock, and a locking member of the lock is blockable with the outer handle when the lock is locked so that the outer handle cannot be actuated and the first lock tongue cannot be move inward, which prevents the door from being opened. However, when the second lock tongue protrudes out of a housing of the vehicle door lock assembly for locking and the door is opened, the second lock tongue will be interfered with the door and the door cannot be closed, which is inconvenient to use.

The present invention is, therefore, arisen to obviate or at least mitigate the above-mentioned disadvantages.

SUMMARY OF THE INVENTION

The main object of the present invention is to provide a vehicle door lock assembly, which allows a vehicle door to be closed when being locked and is convenient to use.

To achieve the above and other objects, the present invention provides a vehicle door lock assembly, including: a housing, a first locking assembly, a second locking assembly, a driving module and a micro switch. The first locking assembly is disposed on the housing and includes an inner handle, an outer handle and a first lock tongue. The first lock tongue has a tendency to move outward of the housing, and the inner handle and the outer handle are movably disposed on the housing and respectively control the first lock tongue to move inward of the housing. The second locking assembly is disposed on the housing and includes a second lock and a second lock tongue. The second lock tongue includes a first segment and a second segment slidably connected with each other, and the first segment and the second segment have a first elastic member disposed therebetween so that the first segment and the second segment have a tendency to move away from each other. The second lock includes a mandrel and a connecting rod, and the mandrel has an assembling portion. The connecting rod is connected between the first segment and the assembling portion. The driving module includes a motor assembled with the mandrel, and the second lock tongue is slid and the second segment is moved inward or outward of the housing when the motor drives the mandrel to rotate forward or reversely. The micro switch includes an inductive element, and the assembling portion have an inductive portion radially protruding therefrom. When the motor drives the mandrel to rotate forward or reversely, the inductive element is inducted with the inductive portion and the micro switch stops a movement of the motor.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
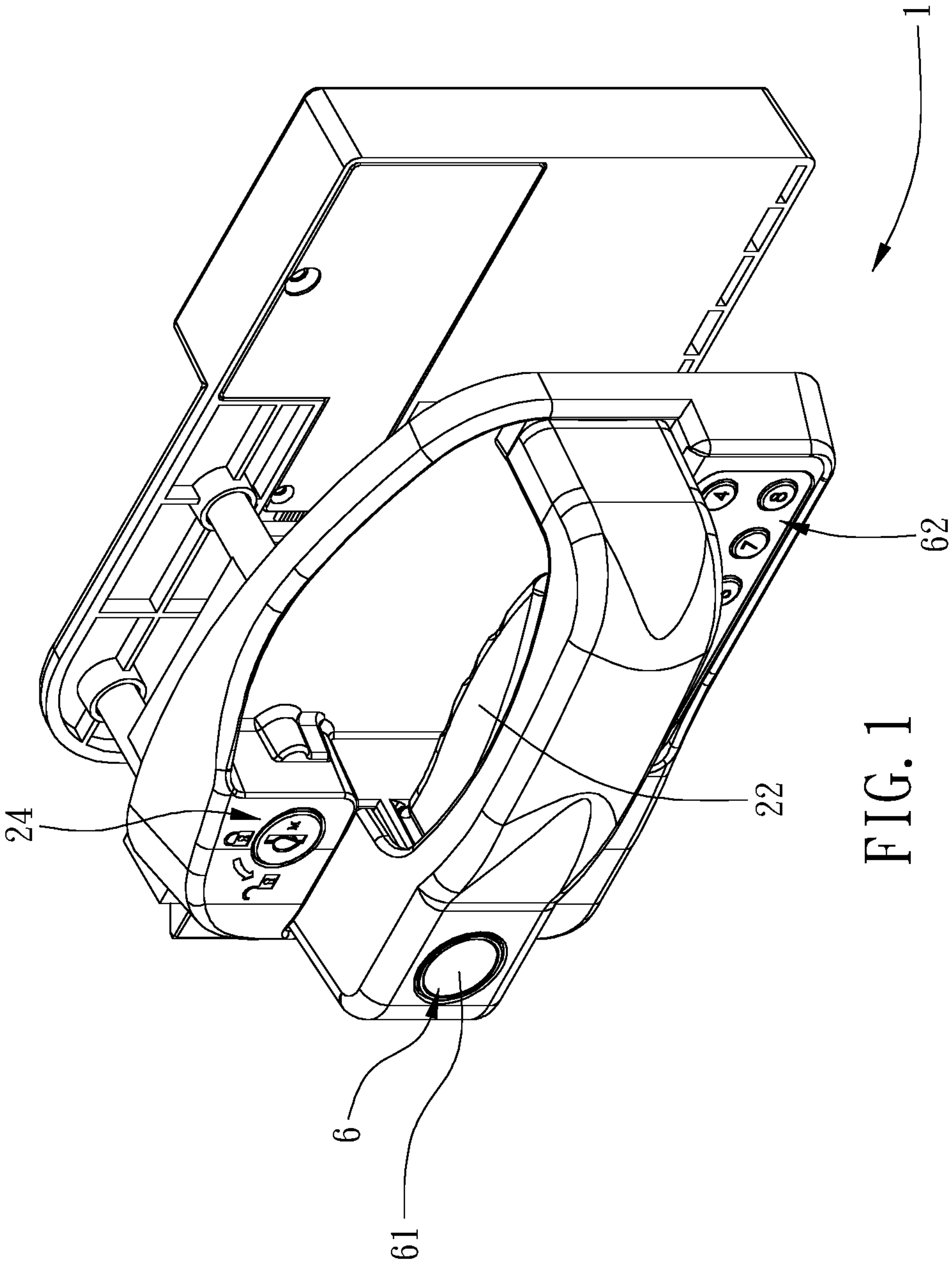
FIG. 1 is a stereogram of a preferable embodiment of the present invention.
Figure 2:
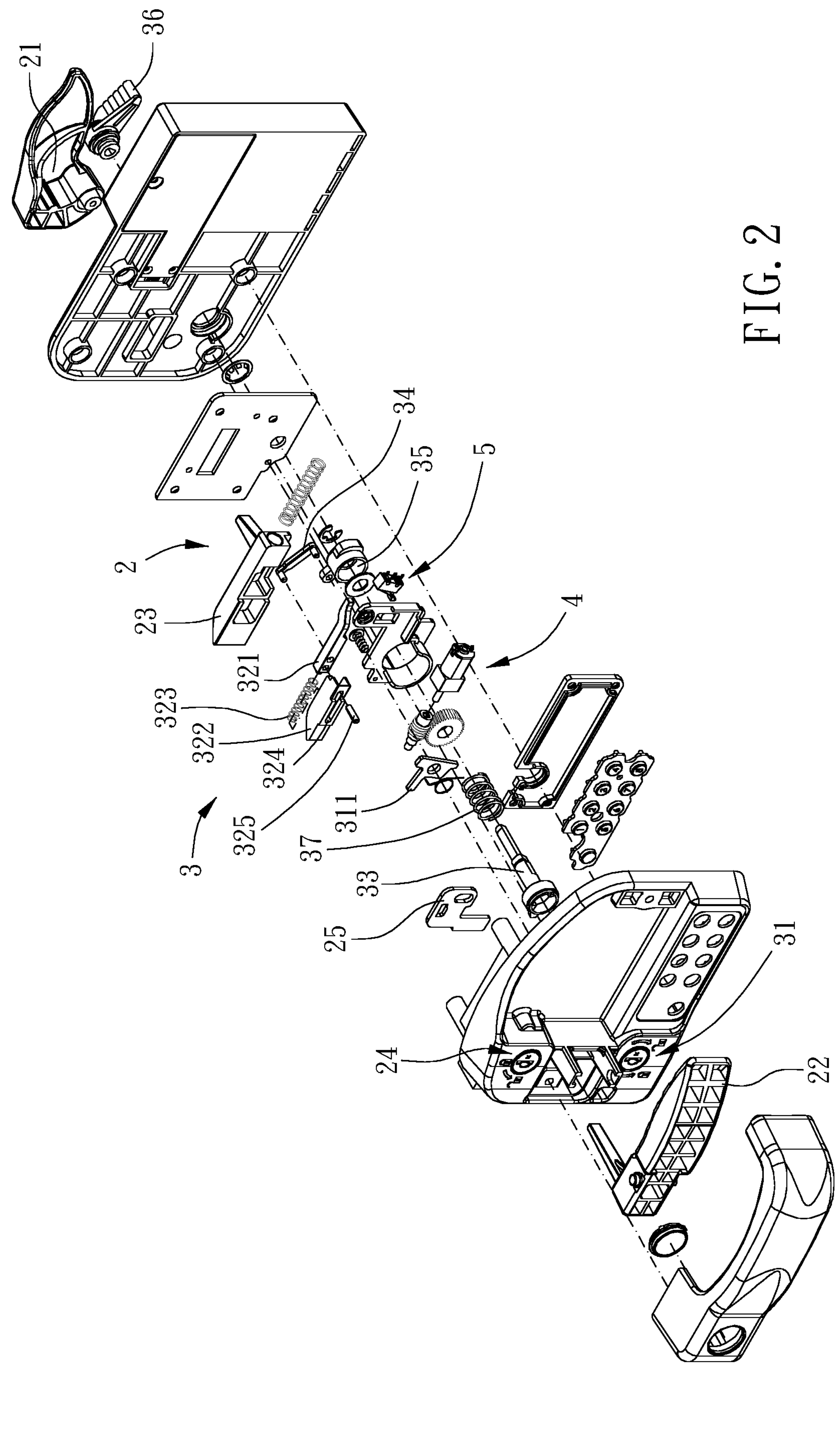
FIGS. 2 and 3 are breakdown drawings of a preferable embodiment of the present invention.
Figure 3:
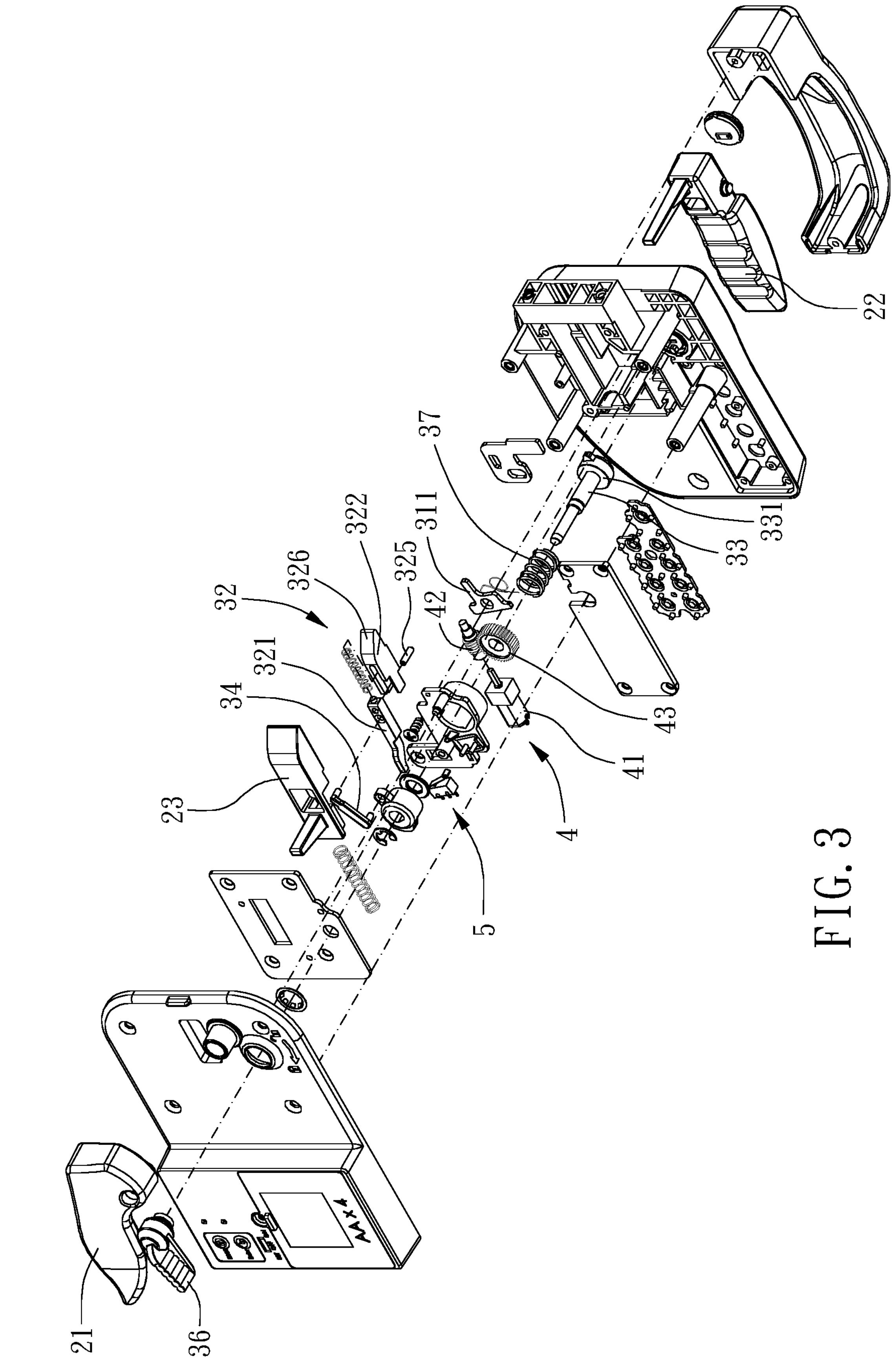
Figure 4:
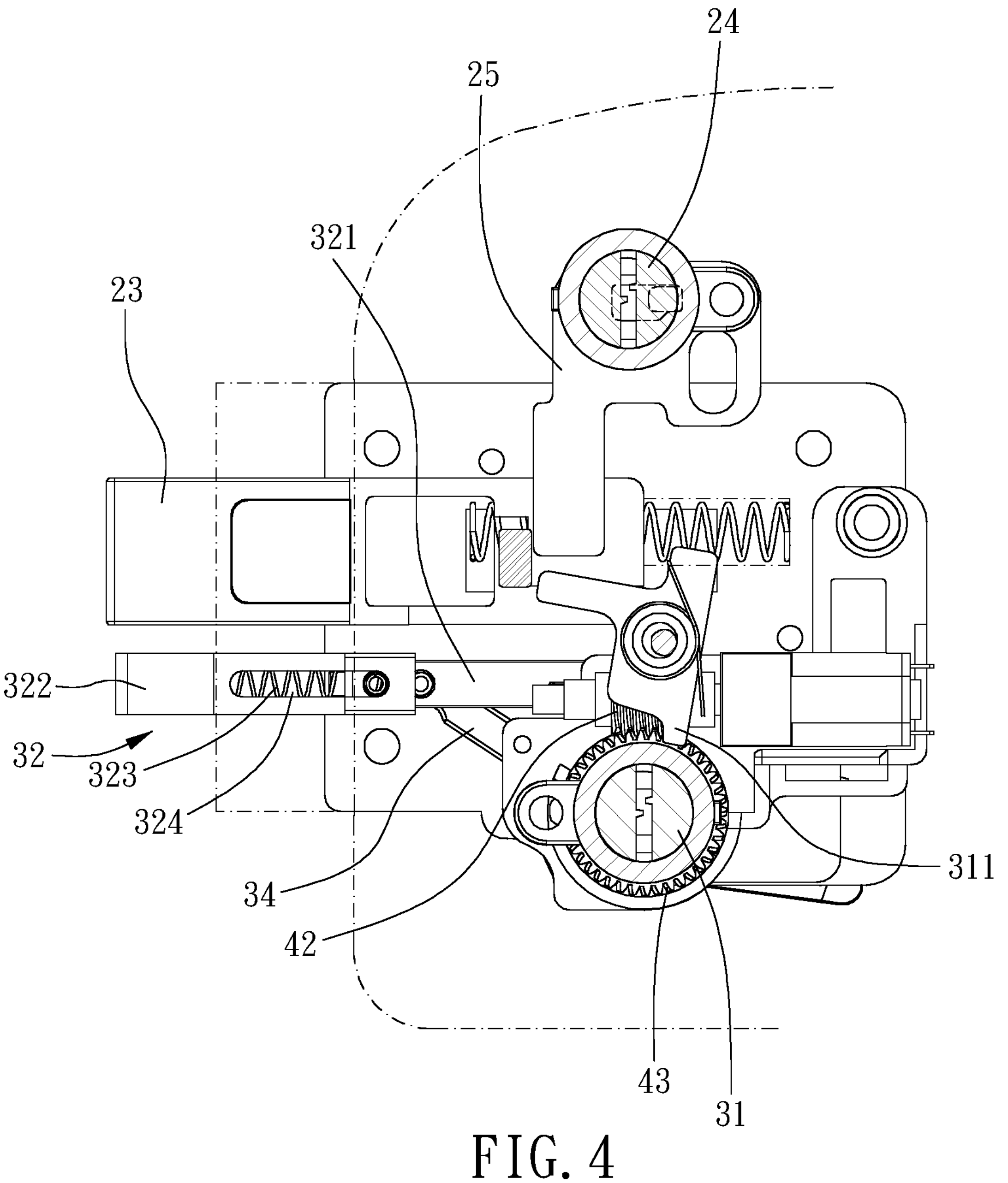
FIGS. 4 and 5 are front views showing operation of a preferable embodiment of the present invention.
Figure 5:
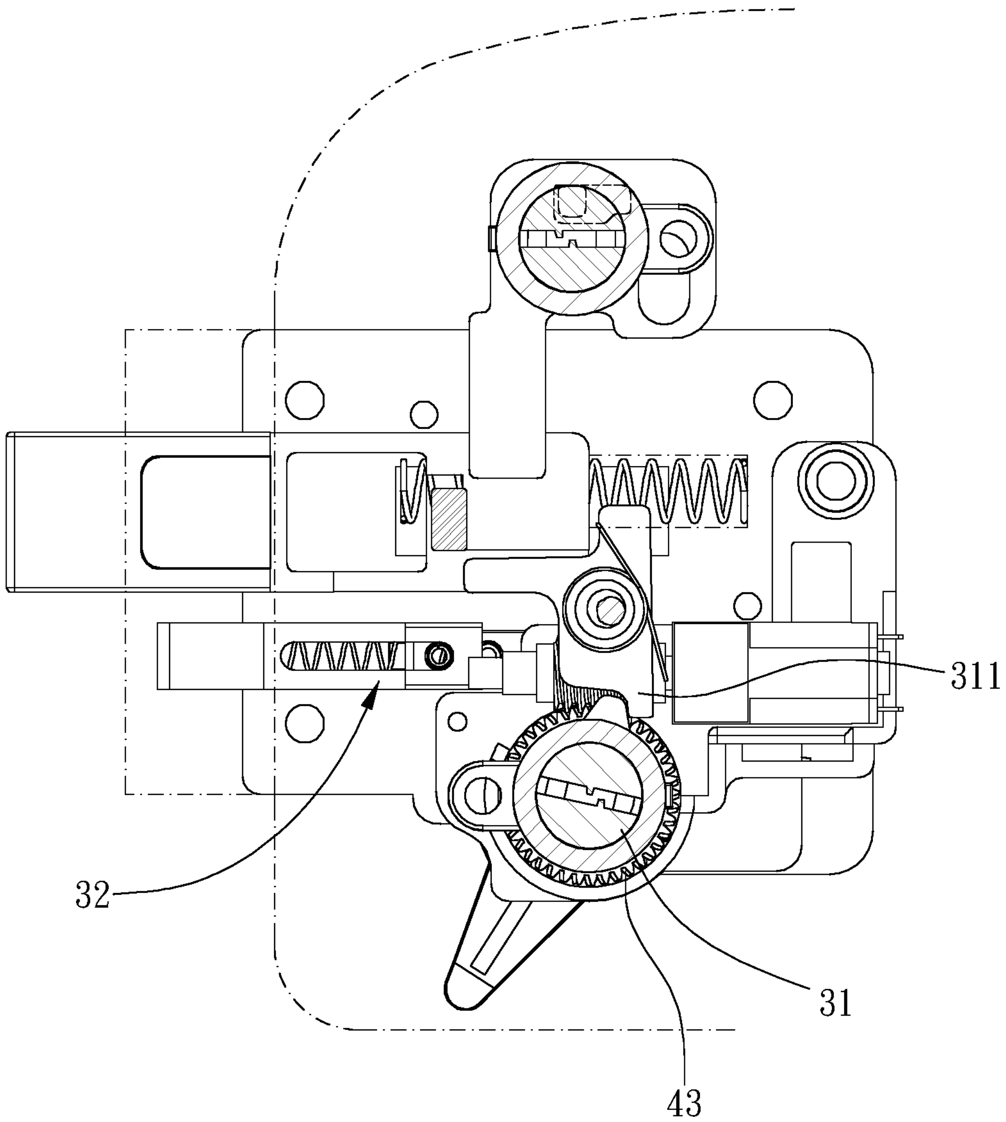
Figure 6:
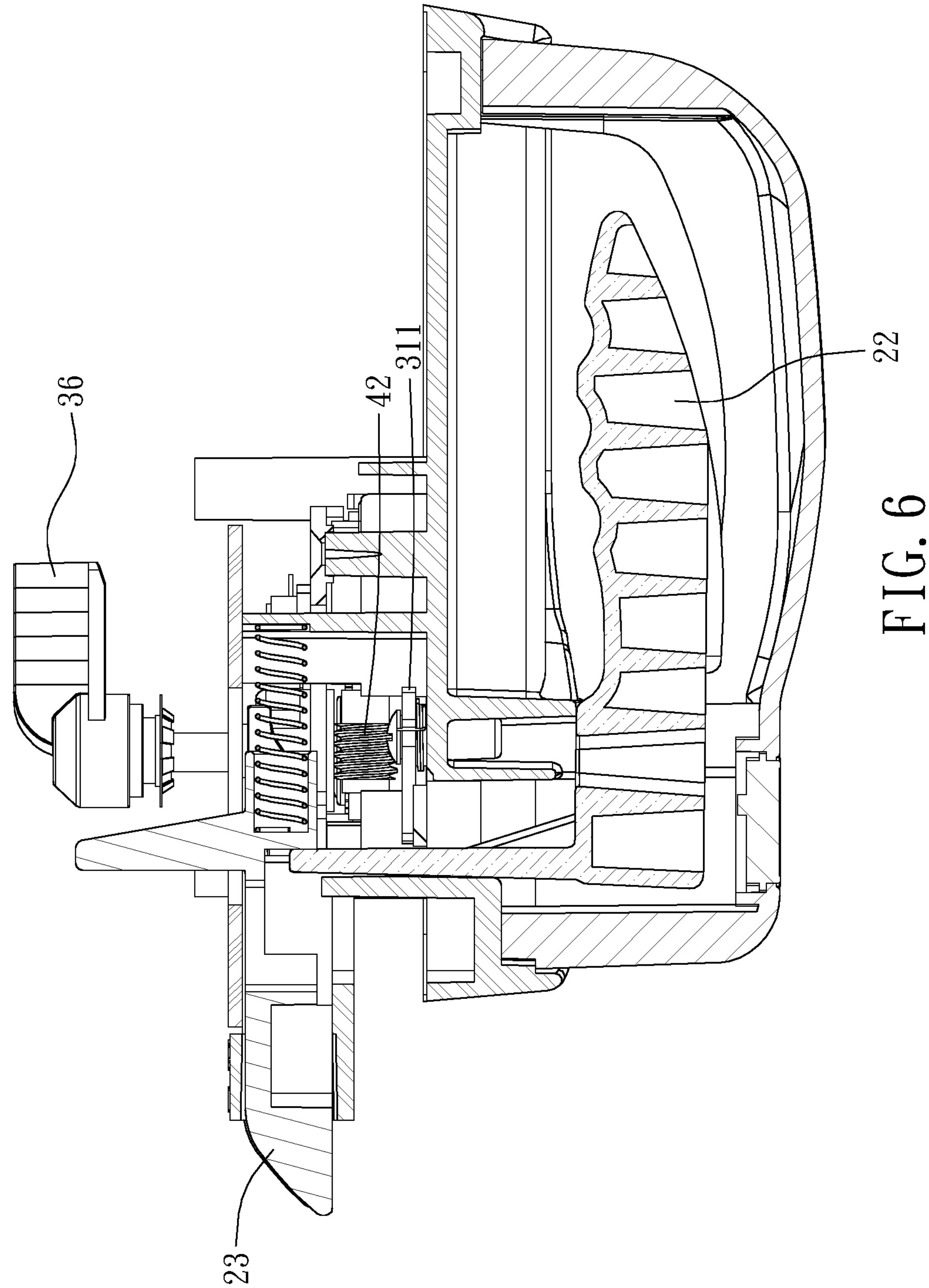
FIGS. 6 and 7 are top views showing operation of a preferable embodiment of the present invention.
Figure 7:
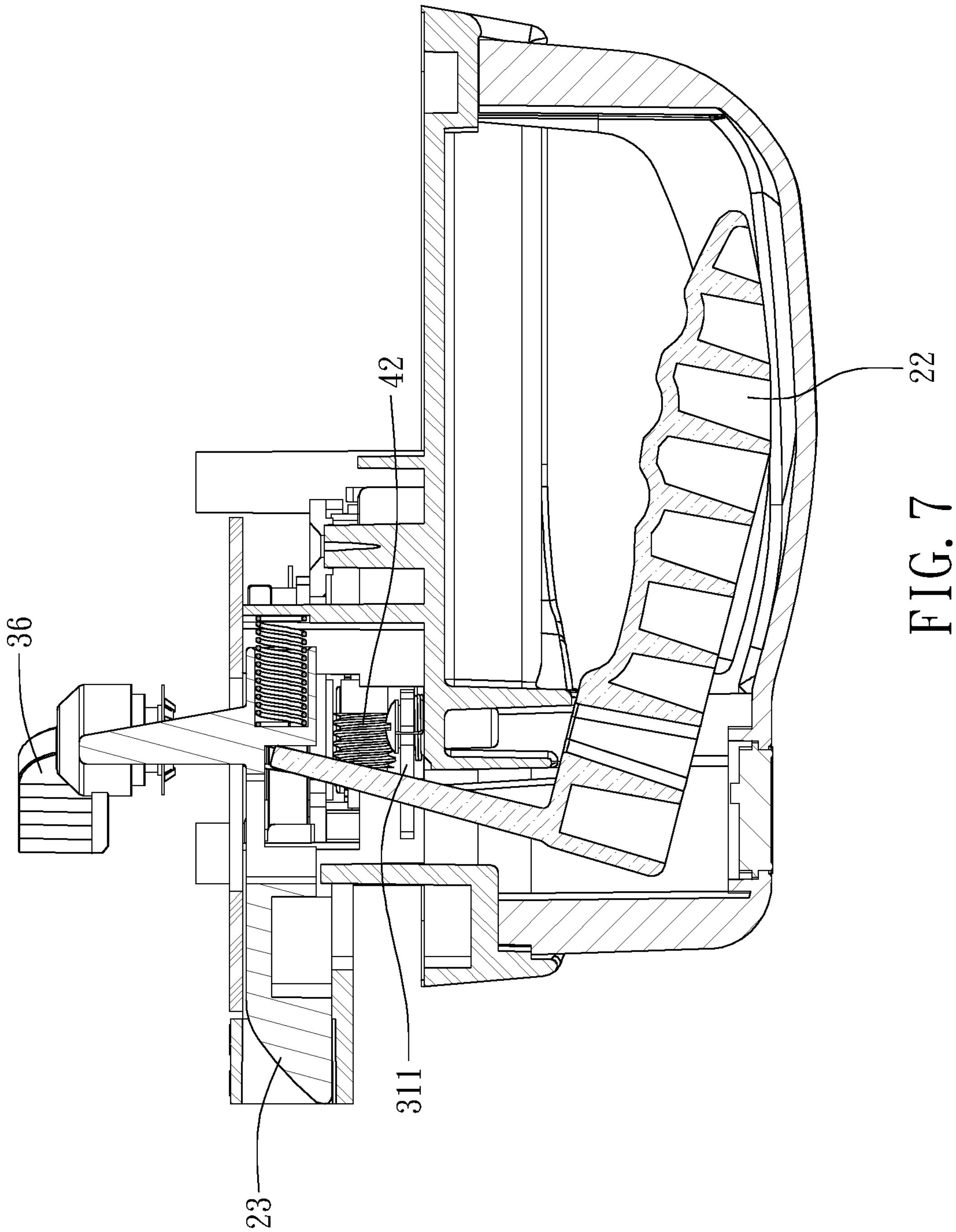
Figure 8:
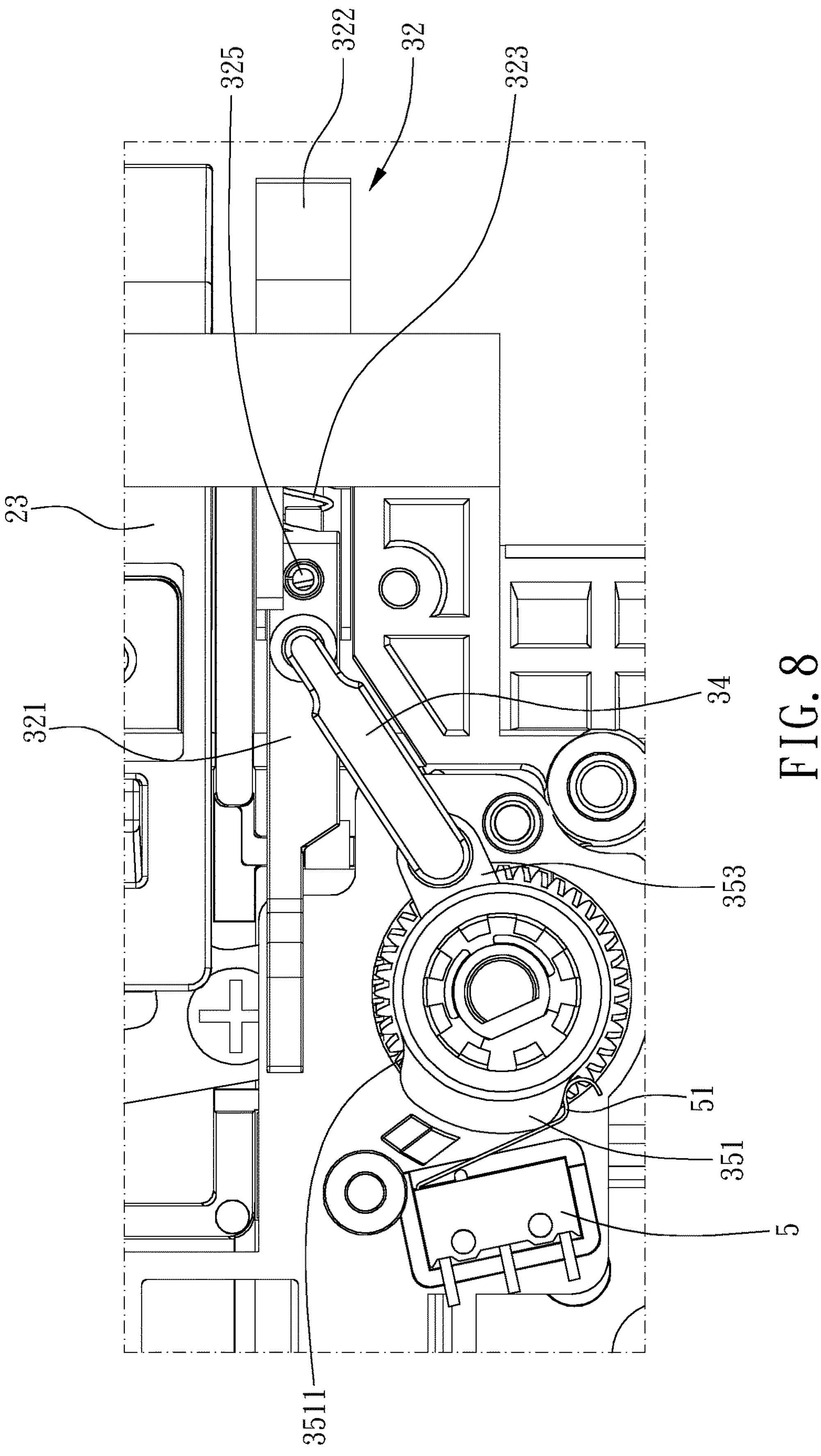
FIGS. 8-10 are rear views showing operation of a preferable embodiment of the present invention.
Figure 9:
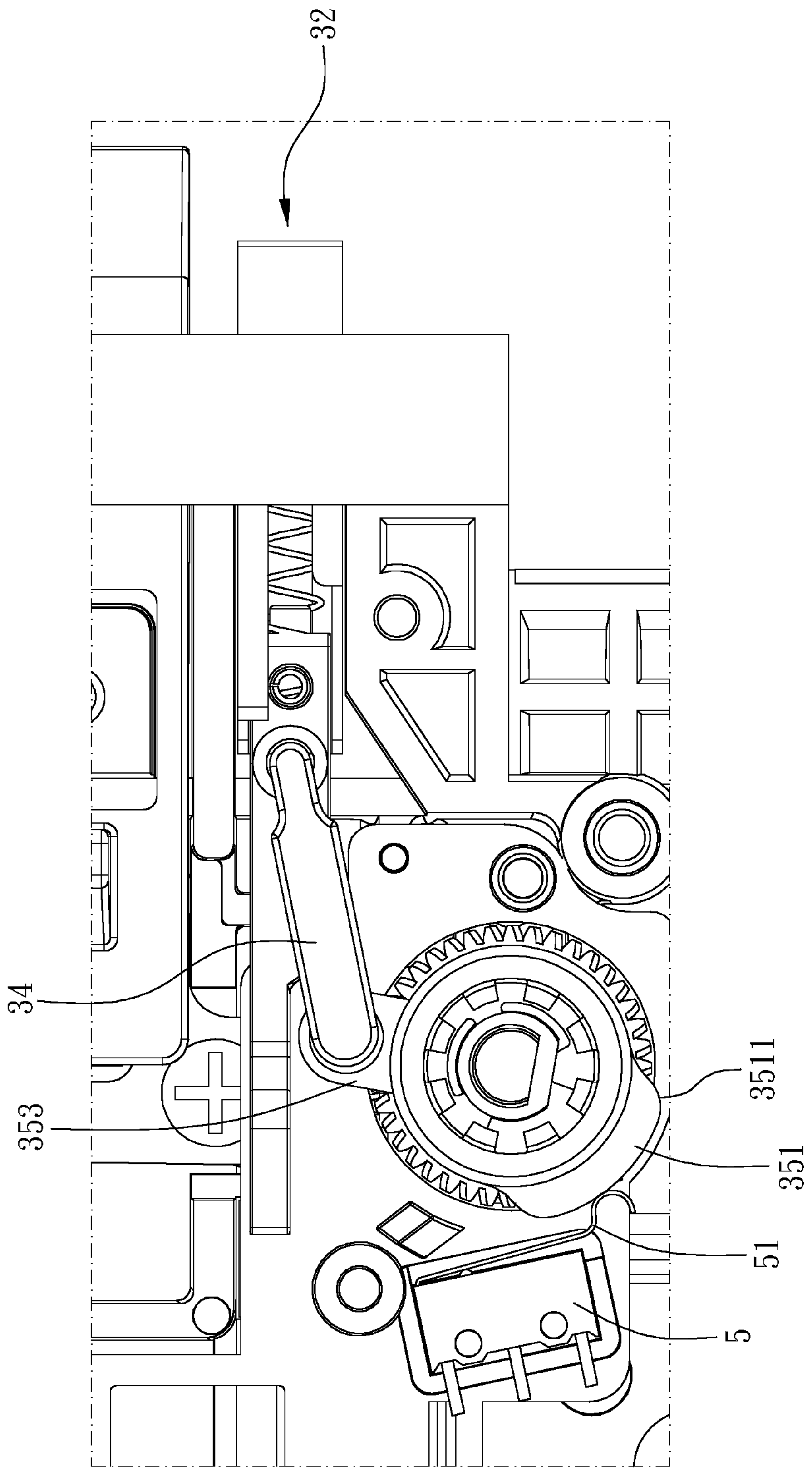
Figure 10:
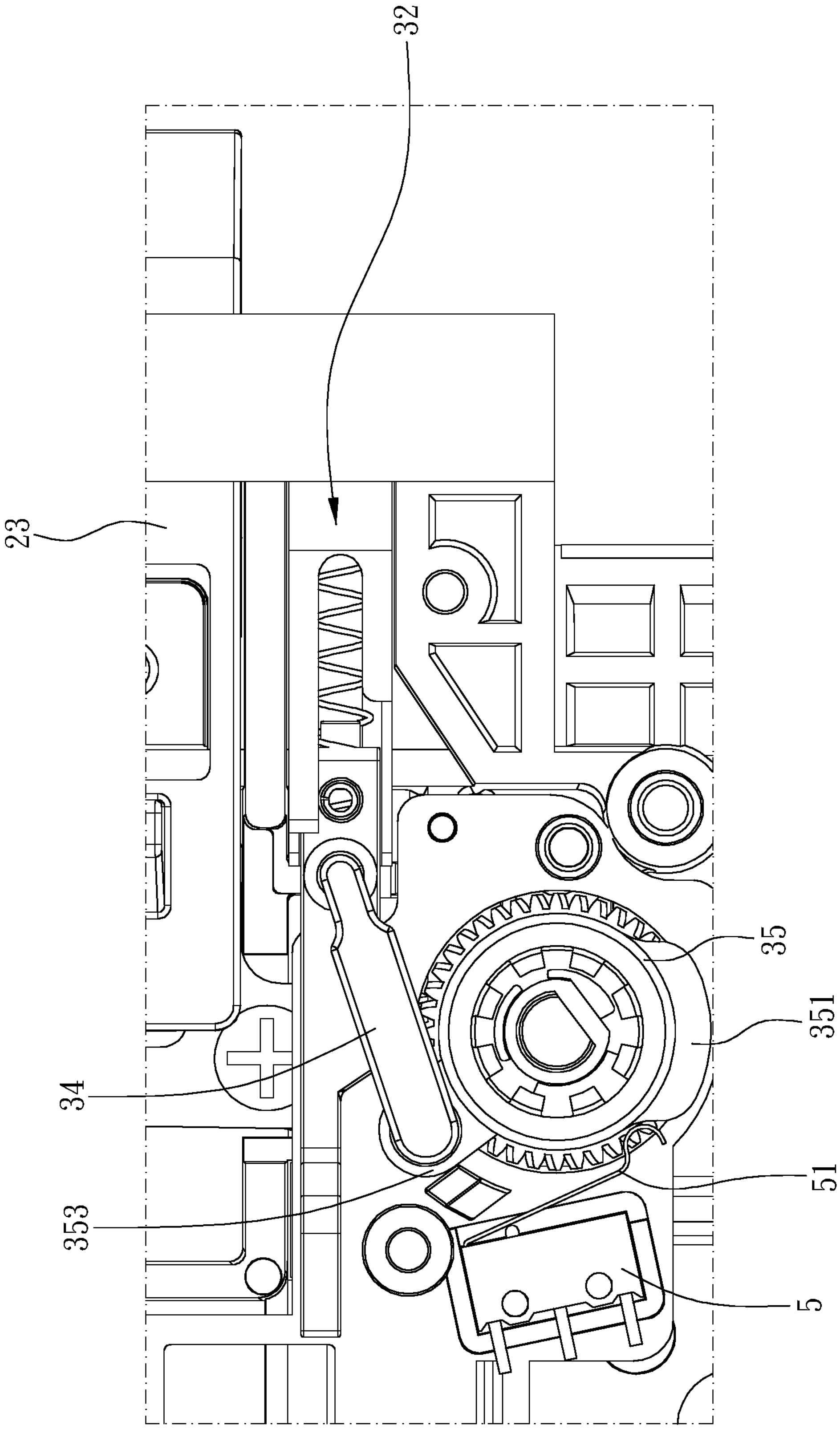
Figure 11:
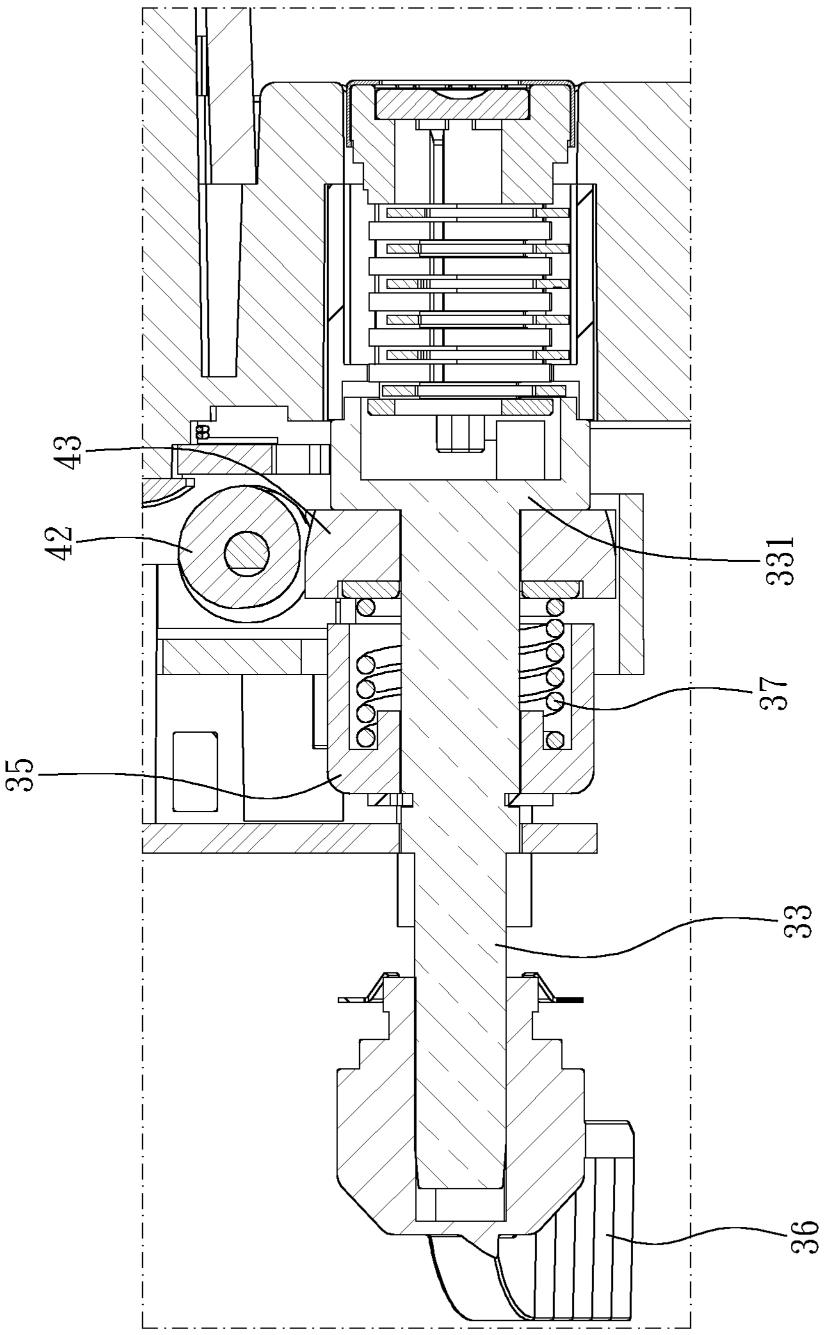
FIG. 11 is a breakdown drawing of a preferable embodiment of the present invention.

Please refer to FIGS. 1 to 11 for a preferable embodiment of the present invention. A vehicle door lock assembly of the present invention includes a housing 1, a first locking assembly 2, a second locking assembly 3, a driving module 4 and a micro switch 5.

The first locking assembly 2 is disposed on the housing 1 and includes an inner handle 21, an outer handle 22 and a first lock tongue 23, and the first lock tongue 23 has a tendency to move outward of the housing 1. The inner handle 21 and the outer handle 22 are movably disposed on the housing 1 and respectively control the first lock tongue 23 to move inward of the housing 1.

The second locking assembly 3 is disposed on the housing 1 and includes a second lock 31 and a second lock tongue 32, and the second lock tongue 32 includes a first segment 321 and a second segment 322 slidably connected with each other. The first segment 321 and the second segment 322 has a first elastic member 323 disposed therebetween so that the first segment 321 and the second segment 322 has a tendency to move away from each other. The second lock 31 includes a mandrel 33 and a connecting rod 34, the mandrel 33 has an assembling portion 35, and the connecting rod 34 is connected between the first segment 321 and the assembling portion 35. The second lock 31 is movable to be locked or unlocked. When the second lock 31 is moved and drives the connecting rod 34 to move, the connecting rod 34 drives the second lock tongue 32 to move outward or inward of the housing 1, and the second lock 31 is configured to be rotatable by a key.

The driving module 4 includes a motor 41 assembled with the mandrel 33, and the second lock tongue 32 is slid and the second segment 322 is moved inward or outward of the housing 1 when the motor 41 drives the mandrel 33 to rotate forward or reversely. Therefore, the mandrel 33 is controllable to rotate by a key or the motor 41.

The micro switch 5 includes an inductive element 51, and the assembling portion 35 further has an inductive portion 351 radially protruding therefrom. When the motor 41 drives the mandrel 33 to rotate forward or reversely, the inductive element 51 is inducted with the inductive portion 351 and the micro switch 5 stops a movement of the motor 41, which accurately restricts a rotatable range of the motor 41 and avoids unexpected operation of the motor 41 to protect the motor 41 and the second lock 31 from damage.

The first lock tongue 23 has a tendency to move outward of the housing 1 so as to engage with a vehicle door when the vehicle door is closed, and the second lock tongue 32 is driven by the mandrel 33 to move inward or outward of the housing 1 so as to lock or unlock the vehicle door. The first segment 321 and the second segment 322 have a first elastic member 323 disposed therebetween so that the first segment 321 and the second segment 322 have a tendency to move away from each other. The second segment 322 has a sliding groove 324, and a pin 325 is disposed within the first segment 321 and slidably disposed within the sliding groove 324. An end of the second segment 322 remote from the first segment 321 has an inclined surface 326 facing toward the inner handle 21. When the second lock 31 is locked, the second segment 322 protrudes out of the housing 1. When the vehicle door is moved to be closed, the inclined surface 326 is abutted against a vehicle body and the second segment 322 is recoverably moved toward the first segment 321, which allows the vehicle door to be smoothly closed.

Specifically, the second locking assembly 3 further includes a control member 36, and the control member 36 is assembled with the mandrel 33 and located out of the housing 1. The driving module 4 further includes a first gear 42 and a second gear 43, the first gear 42 is disposed on the motor 41, and the second gear 43 is sleeved to the mandrel 33 and assembled with the first gear 42. The mandrel 33 further has a second elastic member 37, and the second elastic member 37 is elastically abutted against the second gear 43 so that the second gear 43 has a tendency to abut against a flange 331 radially extending from the mandrel 33 to generate a frictional force. Therefore, the second gear 43 can drive the mandrel 33 to rotate when being driven by the first gear 42. A radial dimension of the assembling portion 35 is larger than a radial dimension of the mandrel 33. The assembling portion 35 is sleeved with the second elastic member 37 and the second elastic member 37 is elastically abutted against and between the assembling portion 35 and the second gear 43 so that the second gear 43 has a tendency to move toward the flange 331.

Moreover, the first gear 42 is a worm gear, and a rotation axis of the first gear 42 is lateral to a rotation axis of the second gear 43. When the mandrel 33 is driven to rotate by the control member 36, the second gear 43 cannot drive the first gear 42 to rotate so that the frictional force between the second gear 43 and the flange 331 is not large enough, and the flange 331 and the second gear 43 are slidable relative to each other, which prevents the first gear 42 from being driven by the second gear 43 for protecting the motor 41.

Furthermore, the assembling portion 35 has a first projection 353 radially protruding therefrom, and the connecting rod 34 is swingably assembled to the first projection 353 so that the connecting rod 34 can be driven to swing.

In this embodiment, the first locking assembly 2 further includes a first lock 24, and the first lock 24 is connected with a first blocking member 25. When the first lock 24 is locked, the first lock 24 drives the first blocking member 25 to move, and the first blocking member 25 is blocked with the outer handle 22 so that the first lock tongue 23 is uncontrollable to move inward of the housing 1 by the outer handle 22. When the first lock 24 is unlocked, the first lock 24 drives the first blocking member to be unblocked with the outer handle 22, and the outer handle 22 drives the first lock tongue 23 to move inward of the housing 1 for opening the vehicle door.

The second lock 31 and the control member 36 are co-movable with each other, and the second lock 31 is connected with a second blocking member 311. The second lock 31 drives the second lock tongue 32 to move outward of the housing 1 when locked, and the second lock 31 drives the second lock tongue 32 to move inward of the housing 1 when unlocked. When the second lock 31 is locked, the second blocking member 311 is blocked with the outer handle 22 so that the first lock tongue 23 is uncontrollable to move inward of the housing 1 by the outer handle 22. When the second lock 31 is unlocked, the second blocking member 311 is unblocked with the outer handle 22 so that the first lock tongue 23 is controllable to move outward of the housing 1 by the outer handle 22. Therefore, when the second lock 31 is locked, the second blocking member 311 is also blocked with the outer handle 22, and the outer handle 22 is non-actuatable via blocking of the first blocking member 25 and the second blocking member 311 so as to have a good structural strength. As such, when a force is exerted on the outer handle 22, the first lock tongue 23 will not be moved inward of the housing 1 so as to provide sufficient security.

In this embodiment, two opposite sides of the inductive portion 351 in a circumferential direction respectively have a chamfer 3511, and the inductive element 51 is abutted against the inductive portion 351. When the motor 41 drives the mandrel 33 to rotate forward or reversely and the inductive element 51 is abutted against one of said chamfers 3511, the micro switch 5 stops the movement of the motor 41, which provides good inductive sensitivity.

The vehicle door lock assembly further includes an electronic lock 6. The electronic lock 6 includes a fingerprint identification unit 61 and a numeric keyboard unit 62, and the electronic lock 6 is communicated with the motor 41. Therefore, the second lock 31 can also be controlled to be locked or unlocked by fingerprint identification or a password.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A vehicle door lock assembly, including:

a housing;

a first locking assembly, disposed on the housing, including an inner handle, an outer handle and a first lock tongue, the first lock tongue having a tendency to move outward of the housing, the inner handle and the outer handle being movably disposed on the housing and respectively controlling the first lock tongue to move inward of the housing;

a second locking assembly, disposed on the housing, including a second lock and a second lock tongue, the second lock tongue including a first segment and a second segment slidably connected with each other, the first segment and the second segment having a first elastic member disposed therebetween so that the first segment and the second segment have a tendency to move away from each other, the second lock including a mandrel and a connecting rod, the mandrel having an assembling portion, the connecting rod connected between the first segment and the assembling portion;

a driving module, including a motor assembled with the mandrel, the second lock tongue being slid and the second segment moved inward or outward of the housing when the motor drives the mandrel to rotate forward or reversely; and a micro switch, including an inductive element, the assembling portion having an inductive portion radially protruding therefrom; wherein when the motor drives the mandrel to rotate forward or reversely, the inductive element is inducted with the inductive portion and the micro switch stops a movement of the motor;

wherein the second locking assembly further includes a control member, the control member is assembled with the mandrel and located out of the housing, the driving module further includes a first gear and a second gear, the first gear is disposed on the motor, the second gear is sleeved to the mandrel and assembled with the first gear, the mandrel further has a second elastic member, and the second elastic member is elastically abutted against the second gear so that the second gear has a tendency to abut against a flange radially extending from the mandrel to generate a frictional force.

2. The vehicle door lock assembly of claim 1, wherein a radial dimension of the assembling portion is larger than a radial dimension of the mandrel, the assembling portion is sleeved with the second elastic member, and the second elastic member is elastically abutted against and between the assembling portion and the second gear so that the second gear has a tendency to move toward the flange.

3. The vehicle door lock assembly of claim 1, wherein the first gear is a worm gear, and a rotation axis of the first gear is lateral to a rotation axis of the second gear.

4. The vehicle door lock assembly of claim 1, wherein the assembling portion has a first projection radially protruding therefrom, and the connecting rod is swingably assembled to the first projection.

5. The vehicle door lock assembly of claim 1, wherein the first locking assembly further includes a first lock, the first lock is connected with a first blocking member; when the first lock is locked, the first lock drives the first blocking member to move, the first blocking member is blocked with the outer handle so that the first lock tongue is uncontrollable to move inward of the housing by the outer handle; and when the first lock is unlocked, the first lock drives the first blocking member to be unblocked with the outer handle.

6. The vehicle door lock assembly of claim 1, wherein two opposite sides of the inductive portion in a circumferential direction respectively have a chamfer, the inductive element is abutted against the inductive portion; and when the motor drives the mandrel to rotate forward or reversely and the inductive element is abutted against one of said chamfers, the micro switch stops the movement of the motor.

7. The vehicle door lock assembly of claim 1, further including an electronic lock, wherein the electronic lock includes a fingerprint identification unit and a numeric keyboard unit, and the electronic lock is communicated with the motor.

8. The vehicle door lock assembly of claim 1, wherein the second segment has a sliding groove, a pin is disposed within the first segment and slidably disposed within the sliding groove, and an end of the second segment remote from the first segment has an inclined surface facing toward the inner handle.

9. A vehicle door lock assembly, including: a housing;

a first locking assembly, disposed on the housing, including an inner handle, an outer handle and a first lock tongue, the first lock tongue having a tendency to move outward of the housing, the inner handle and the outer handle being movably disposed on the housing and respectively controlling the first lock tongue to move inward of the housing;

a second locking assembly, disposed on the housing, including a second lock and a second lock tongue, the second lock tongue including a first segment and a second segment slidably connected with each other, the first segment and the second segment having a first elastic member disposed therebetween so that the first segment and the second segment have a tendency to move away from each other, the second lock including a mandrel and a connecting rod, the mandrel having an assembling portion, the connecting rod connected between the first segment and the assembling portion;

a driving module, including a motor assembled with the mandrel, the second lock tongue being slid and the second segment moved inward or outward of the housing when the motor drives the mandrel to rotate forward or reversely; and a micro switch, including an inductive element, the assembling portion having an inductive portion radially protruding therefrom; wherein when the motor drives the mandrel to rotate forward or reversely, the inductive element is inducted with the inductive portion and the micro switch stops a movement of the motor;

wherein the second lock and a control member are co-movable with each other, the second lock is connected with a second blocking member, the second lock drives the second lock tongue to move outward of the housing when locked, the second lock drives the second lock tongue to move inward of the housing when unlocked; when the second lock is locked, the second blocking member is blocked with the outer handle so that the first lock tongue is uncontrollable to move inward of the housing by the outer handle; and when the second lock is unlocked, the second blocking member is unblocked with the outer handle so that the first lock tongue is controllable to move outward of the housing by the outer handle.

* * * * *